United States Patent
Mossakowski

(10) Patent No.: US 7,787,862 B2
(45) Date of Patent: Aug. 31, 2010

(54) METHOD FOR VIDEO MONITORING OBJECTS BY MEANS OF A MOBILE COMMUNICATIONS SYSTEMS

(75) Inventor: Gerd Mossakowski, Ahlen (DE)

(73) Assignee: T-Mobile Deutschland GmbH, Bonn (DE)

( * ) Notice: Subject to any disclaimer, the term of this patent is extended or adjusted under 35 U.S.C. 154(b) by 753 days.

(21) Appl. No.: 10/522,520

(22) PCT Filed: Jul. 29, 2003

(86) PCT No.: PCT/DE03/02556

§ 371 (c)(1),
(2), (4) Date: Aug. 14, 2006

(87) PCT Pub. No.: WO2004/015951

PCT Pub. Date: Feb. 19, 2004

(65) Prior Publication Data

US 2007/0091166 A1    Apr. 26, 2007

(30) Foreign Application Priority Data

Jul. 29, 2002  (DE) ................................. 102 34 644

(51) Int. Cl.
*H04M 1/66* (2006.01)
*H04N 9/18* (2006.01)
*G08B 13/14* (2006.01)

(52) U.S. Cl. ..................... 455/411; 348/152; 340/568.1

(58) Field of Classification Search ................. 370/241, 370/348; 455/411, 435, 566; 348/152, 211.2, 348/154, 143, 333.01; 340/568.1; 375/240.1; 382/232

See application file for complete search history.

(56) References Cited

U.S. PATENT DOCUMENTS

| | | | |
|---|---|---|---|
| 6,930,994 B1 * | 8/2005 | Stubbs | 370/348 |
| 2003/0020611 A1 * | 1/2003 | Script et al. | 340/568.1 |
| 2003/0050062 A1 * | 3/2003 | Chen et al. | 455/435 |
| 2003/0107648 A1 * | 6/2003 | Stewart et al. | 348/143 |
| 2003/0112354 A1 * | 6/2003 | Ortiz et al. | 348/333.01 |
| 2008/0170505 A1 * | 7/2008 | Rohlfing et al. | 370/241 |

FOREIGN PATENT DOCUMENTS

| | | |
|---|---|---|
| DE | 100 53 683 A | 5/2002 |
| JP | 2000232680 A | 8/2000 |
| WO | 00/74342 A1 | 12/2000 |
| WO | WO 0103402 A | 1/2001 |
| WO | WO 01 31925 | 5/2001 |
| WO | WO 0193546 A | 12/2001 |
| WO | WO 0201531 A | 1/2002 |
| WO | WO 02054677 A | 7/2002 |

\* cited by examiner

*Primary Examiner*—Charles N. Appiah
*Assistant Examiner*—Kiet Doan
(74) *Attorney, Agent, or Firm*—Norris McLaughlin & Marcus, PA; Christa Hildebrand, Esq.

(57) ABSTRACT

The invention is directed to a method for video object monitoring with a mobile communication system, whereby a connection between a transmitter provided with a video camera and at least one receiver is established for transmitting video data over the mobile communication system.

To ensure that the video data transmitted by the transmitter can only be received by authorized receivers, the invention provides that before or while the connection is set up, a device of the mobile communication system checks, if the receiver is authorized to receive video data from the transmitter.

14 Claims, 1 Drawing Sheet

METHOD FOR VIDEO MONITORING OBJECTS BY MEANS OF A MOBILE COMMUNICATIONS SYSTEMS

BACKGROUND OF THE INVENTION

1) Field of the Invention

This is an application filed under 35 USC §371 of PCT/DE2003/002556 and claiming priority under DE 102 34 644.5 filed on Jul. 29, 2002.

The invention relates to the method for video object monitoring with a mobile communication system wherein, for transmitting video data via the mobile communication system, a connection is set up between a transmitter provided with a video camera and at least one receiver.

Different technologies are used for different monitoring tasks. All technologies have in common that the signals, for example image and sound data, are initially recorded in a transmitting unit with a microphone, camera, sensors etc. and then transmitted to a remote receiving station. These receiving stations can be implemented, for example, as control monitors in security centers, baby phone receivers, etc.

2) Description of the Related Art

The technologies used for transmitting the data can be classified initially as technologies for local operation and as technologies for long-distance operation.

For local operation, mostly covering distances between transmitter and receiver of less than 300 m, the data are transmitted via a direct cable connection or by radio transmission. Systems used for radio transmission typically establish a direct wireless connection between transmitter and receiver. Disadvantageously, however, the receiving station has to be located in close proximity to the monitored object or area. EP 1 124 355 A2 describes an exemplary video monitoring system. The video data are here recorded by a camera and transmitted via a cordless telephone system. The video image can be viewed on the display of the cordless telephone.

For long-distance operation, a dial-up connection is set up, as needed, between the transmitter and receiver via a public communication network. The dial-up connection can be set up following a triggering event (trigger), and can be triggered, for example, by motion sensors or also in regularly scheduled time intervals. It is also known to transmit video image from so-called Webcams via the Internet. Such long-distance transmission of video signals via an ISDN network or a mobile radio-communication network C is known from DE 41 26 105 A1.

WO 02 01531 A1 discloses an alarm system, wherein different sensors, including monitoring cameras, are arranged in an object to be monitored, with the signals of the sensors being transmitted to an automatic processing unit. If the sensors and the processing unit detect unusual activities, then an alarm signal is triggered and sent to a central alarm unit. The alarm signal can be sent from there to the user of the alarm system and to other predetermined locations. The user has access to the central alarm unit, for example via an Internet portal or his/her mobile telephone, and can retrieve from there information about the personal alarm system and can also define/change settings. Access to the central alarm system is provided through identification by username and password.

WO 02 054677 A1 discloses a method for providing telecommunication services in a mobile communication system, enabling data transmission between a mobile station of the mobile communication system and a terminal of another wireless network, for example WLAN, GSMLAN.

WO 01 03402 A1 is directed to a method for authentication of a subscriber of a first communication network in a second communication network, wherein an address is assigned to the subscriber in the second communication network, with the address being linked to the known identity of the subscriber in the first communication system, and the subscriber in the second communication network being authenticated based on this identity.

WO 01 31925 A1 discloses a method and a system for video monitoring, wherein the video signal is captured by a video camera and transmitted via a mobile communication network to a receiver, for example a video-capable mobile telephone. No specific authentication check of the receiver is provided.

However, all transmission methods must ensure that only an authorized receiver can receive the video data from the transmitter. This can be accomplished with a dial-up connection, for example, by inquiring a username in combination with a password, and in the Internet by using known encryption methods (e.g., certificates).

Both the transmitter and the receiver must ensure that the transmission is secure, which may be difficult to implement for technically inexperienced users.

It is the object of the invention to provide a method for the video object monitoring with a mobile communication system, wherein a user without technical know-how can readily set up a secure video transmission via the Mobil communication system

BRIEF SUMMARY OR THE INVENTION

This object is solved with the invention in that before or while a connection is set up, a device of the mobile communication system checks if the receiver is authorized to receive video data from the transmitter, and in that a subscriber relationship of the mobile communication system and/or a temporary IP address is associated with a corresponding transmitter and receiver, wherein the two subscriber relationships and/or the IP addresses are linked in a database of the operator of the mobile communication system, and in that an authorization of the receiver for receiving the video data from the transmitter is checked based on the linked data.

Advantageous embodiments and modifications of the invention are recited in the dependent claims.

The invention has the following advantages over the state of the art:

The method provides excellent mobility by using mobile monitoring terminals.

No landline connection, for example via a fixed public network, is necessary.

Video data can be easily transmitted over long distances, being limited only by the transmission range of the mobile communication system.

An existing mobile radio-communication infrastructure, for example GSM/UMTS, can be used for transmitting the video data.

The established dedicated identification process of the mobile communication system, for example provided by a SIM card, can be used for identifying the transmitter and receiver to the communication network or for mutual identification of transmitter and receiver.

The transmitter and receiver can be personalized according to government regulations (e.g. G10 in Germany).

It is an object of the invention to offer the user a completely pre-configured transmission method and a corresponding pair of suitable devices. The device pair consists of a transmitter and a receiver. The transmitter includes a video camera, a microphone, optionally additional sensors, for example motion detectors, and a GSM/UMTS wireless device. All these devices all preferably integrated in a compact unit, but can also be implemented as separate units interconnected with connecting cables or via a wireless interface, for example infrared or Bluetooth. The receiver is a GSM/UMTS terminal capable of reproducing moving images and audio signals. To selectively receive and control more than one transmitter, the terminal on the receiver side can include a kind of "browser", for example based on the WAP or (X)HTM technology, that can be used to select the transmitter to be received. A connection between the transmitter and the receiver can advantageously be set up by dialing the mobile subscriber telephone number (MSISDN) assigned to the selected transmitter. Both the transmitter and the receiver can therefore set up a connection.

A connection can also be set up by dialing a temporary IP address assigned to the transmitter and the receiver.

According to the invention, both the transmitter and the receiver can be equipped with a video camera, so that the transmitter can optionally be used as a receiver, and the receiver can optionally be used as a transmitter.

The method can be used in many ways. For example, it can be used as a type of baby phone with video control. It can also be used for monitoring remote areas, for example for detecting a burglary at a primary residence, a vacation home, manufacturing and industrial buildings, etc. It can also be used for monitoring construction sites or traffic. It would also be feasible to monitor hospital patients with a mobile device. A mobile Webcam could also be implemented.

Advantageously, all these applications allow only an authorized receiver to receive video data from the transmitter.

DETAILED DESCRIPTION OF THE INVENTION

Figure 1:
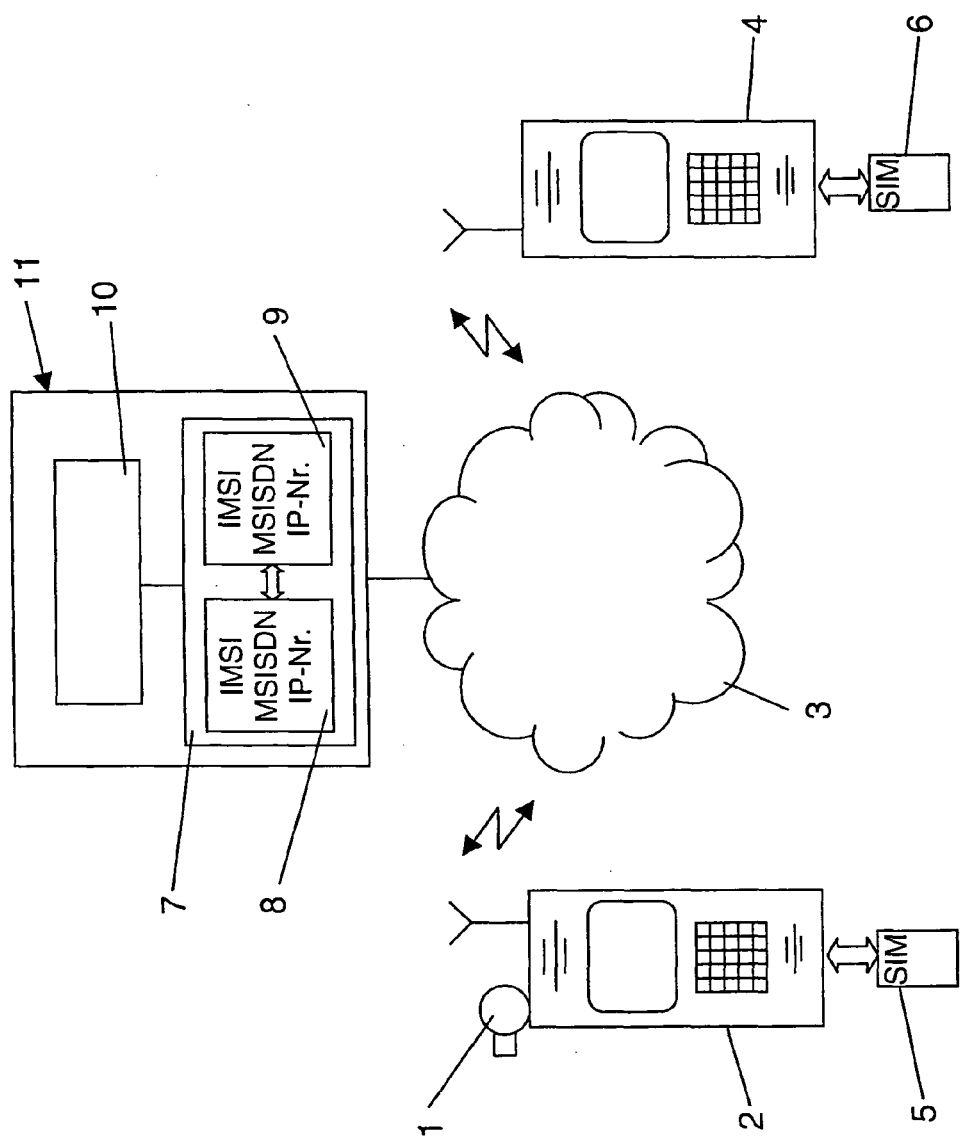
FIG. 1 shows an exemplary embodiment of the invention
An exemplary embodiment of the invention will now be described with reference to the drawing.

On the transmitter side, the system includes a video camera 1 that is connected to a GSM/UMTS mobile communication terminal 2. Ideally, the video camera 1 can include a GSM/UMTS module, or a GSM/UMTS terminal 2 can be equipped with a video camera 1. If the video camera 1 and the GSM/UMTS terminal 2 are implemented as separate units, then a wireless data link can be established between the video camera 1 and the GSM/UMTS terminal 2, for example via Bluetooth.

The unit of video camera 1 and GSM/UMTS terminal 2 is capable of encoding the video signal captured by the video camera 1 for transmission over the mobile communication network 3 using the standard GSM/UMTS transmission channels, such as GPRS, HSCSD, UMTS Video Bearer.

On the receiver side, at least one GSM/UMTS terminal 4 is provided that is capable of processing the video and audio information transmitted by the transmitter and display or reproduce the information on a display of the terminal 4.

In addition, a subscriber identification module 5 and 6, for example in the form of a SIM card, is required for each transmitter unit 2 and for each receiver unit 4. The SIM cards 5 and 6 of the corresponding transmitter or transmitters 2 and of the receiver 4 are assigned a common subscriber association by a network operator 11 of the mobile communication network 3. For this purpose, the mobile communication network includes a database 7, where subscriber data 8 and 9, for example IMSI and/or MSISDN, of the transmitter 2 and the receiver 4 are stored and associated with each other. When the subscriber attempts to use the receiver 4 to set up a connection to a transmitter 2, a control device 10 of the network operator 11 checks first if the receiver 4 is authorized to receive video data from the transmitter 2. This ensures that only transmissions between defined subscriber associations are allowed. Transmissions to other receivers are only possible, if the transmitting unit 2 explicitly authorizes the receivers (outside the subscriber association). This authorization is stored with the operator 11 of the mobile communication system.

Because the GSM/UMTS networks have very limited resources and in most cases data need not be transmitted continually, transmission preferably occurs only when initiated by a trigger, i.e., a triggering event. Triggering can be initiated either from the transmitter 2 or from the receiver 4.

Triggers can be set off:
at periodic time intervals
if requested directly by the transmitter or the receiver
by external signals and parameters captured by the transmitter or receiver, for example when threshold values are exceeded, based on a measured audio volume, based on a detected motion, based on brightness, etc.

If the transmitter 2 is powered by a battery, for example a rechargeable battery, then measures should be taken to conserve power. For example, only video data that are to be transmitted may be processed. The transmitter 2 can also be operated in standby mode, which can be canceled by a trigger signal, whereby the device is then switched to an active mode.

The employed terminals 2 and 4 can be used in different modes, for example in a monitoring mode which can include video monitoring, or in a "normal" mobile radio-communication mode, i.e., without security interrogation regarding receive authorization of the receiver.

Before being able to use the method, the user (subscriber) must purchase a transmitting unit that includes of video camera 1 and GSM/UMTS terminal 2 and/or a receiver unit that includes a GSM/UMTS terminal 4 with a video display. The subscriber must also purchase corresponding SIM cards 5, 6 for the transmitter 2 and the receiver 4, respectively. The operator 11 of the mobile communication system 3 enters the IMSI/MSISDN numbers of the transmitter 2 and the receiver 4 associated with the subscriber association into a database 7, thereby linking the two subscriber associations 8, 9.

The operator 11 of the mobile communication system can also enter specific routing rules for IP addresses from particular address ranges into corresponding router/firewalls of the mobile communication system. The routing rules can specify, for example, that only one additional defined IP address obtains access to a particular IP address from the address range.

For example, a connection can be set up as follows:
The transmitter 2 and the receiver 4 subscribe to the GSM/UMTS communication network 3, which requires the subscriber data stored on the SIM cards 5, 6. The subscriber data, for example the IMSI/MSISDN, are stored in the database 7. A dynamic public IP address from a specific address range stored in the database 7 is assigned to the transmitter 2. Likewise, a dynamic public IP address is assigned to the receiver 4. The receiver 4 can now search for and/or select a particular transmitter 2 based on the data in the database 7. Based on the information in the database 7, the control device 10 then checks if the receiver 4 is authorized to receive the selected transmitter 2. If the receiver 4 is authorized to receive the transmitter 2, then the receiver 4 can directly contact the transmitter, for example by setting up a connection to the temporary IP address or by dialing the telephone number of the transmitter 2 of the mobile subscriber. When the desired connection to the transmitter 2 is established, the transmitter 2 transmits the desired video and audio information to the receiver 4 via the mobile communication system 3.

LIST OF A REFERENCE NUMERALS

1 video camera
2 mobile communication terminal (transmitter)
3 mobile communication network
4 mobile communication terminal (receiver)
5 SIM
6 SIM
7 database
8 subscriber data
9 subscriber data
10 control device
11 operator

The invention claimed is:

1. A method for video object monitoring with a mobile communication system, wherein for transmitting video data via the mobile communication system a connection is set up between a transmitter provided with a video camera and at least one receiver, the method comprising the steps of before or while the connection is set up, checking by a device of the mobile communication system if the receiver is authorized to receive video data from the transmitter, and checking that a subscriber relationship (8, 9) of the mobile communication system and/or a temporary IP address is associated with a corresponding transmitter and receiver, wherein the two subscriber relationships and/or the IP addresses are linked in a database of the operator (11) of the mobile communication system, checking authorization of the receiver for receiving the video data from the transmitter, based on the linked data, storing information about an international mobile subscriber identification (IMSI) and/or a mobile subscriber telephone number (MSISDN) and/or an IP address assigned to the transmitter and the receiver in the database, and setting up a connection between transmitter and receiver by dialing the associated mobile subscriber telephone number (MSISDN) or an IP address.

2. The method according to claim 1, further comprising the step of storing routing rules for transmitting video data between the transmitter and receiver in the database.

3. The method according to claim 1, further comprising the step of requiring a corresponding subscriber identification module SIM (5, 6) of the mobile communication system for operating the transmitter and the receiver.

4. The method according to claim 3, further comprising the step of controlling access to the mobile communication system in the form of an identification and authentication of the transmitter and the receiver based on the data stored on the subscriber identification module (5, 6).

5. The method according to claim 1, further comprising the step of setting up a connection or transmitting data only upon a request from the transmitter and/or the receiver.

6. The method according to claim 1, further comprising the step of setting up a connection or transmitting data between transmitter and receiver only based on a triggering event.

7. The method according to claim 6, wherein the triggering event is detection of movement by a motion sensor or a regularly scheduled time interval.

8. The method according to claim 1, further comprising the step of transmitting audio data and/or data from sensors located on the transmitter-side in addition to the video data.

9. The method according to claim 1, further comprising the step of implementing the mobile communication system as a GSM or UMTS mobile communication system.

10. The method according to claim 1, further comprising the step of transmitting the video data in form of transmission protocols that are standardized for use in the mobile communication system.

11. A device for video object monitoring with a mobile communication system, comprising a transmitter provided with a video camera for recording video data, at least one receiver capable of receiving the video data, the mobile communication system for transmitting the video data between the transmitter and the receiver, a database of the mobile communication system for linking two subscriber relationships and/or IP addresses, and a device (10) for checking, based on the data stored in the database, if a subscriber relationship (8, 9) of the mobile communication system and/or IP address associated with the transmitter and the receiver are linked; and if the receiver is authorized to receive the video data from the transmitter, wherein information about an international mobile subscriber identification (IMSI) and/or a mobile subscriber telephone number (MSISDN) and/or an IP address assigned to the transmitter and the receiver is stored in the database, and wherein a connection is set up between the transmitter and the receiver by dialing the associated mobile subscriber telephone number (MSISDN) or an IP address.

12. The device according to claim 11, wherein routing rules for transmitting video data between the transmitter and receiver is stored in the database.

13. The device in accordance with claim 11, wherein a connection or transmitting data between transmitter and receiver is set up only based on a triggering event.

14. The device in accordance with claim 13, wherein the triggering event is detection of movement by a motion sensor or a regularly scheduled time interval.

* * * * *